United States Patent
Lee et al.

(10) Patent No.: US 7,196,485 B1
(45) Date of Patent: Mar. 27, 2007

(54) UNIVERSAL LOW-POWER CEILING FAN CONTROLLER

(76) Inventors: Ching-Tan Lee, No. 52, Lane 480, Sec. 2, Fenghsi Rd., Fengyuan, Taichung Hsien (TW); Chin-Hsiung Chang, No. 947, Lin-Sen Rd, Wu-Fong, Taichung Hsien (TW)

( * ) Notice: Subject to any disclaimer, the term of this patent is extended or adjusted under 35 U.S.C. 154(b) by 0 days.

(21) Appl. No.: 11/362,092

(22) Filed: Feb. 27, 2006

(30) Foreign Application Priority Data

Nov. 22, 2005 (TW) ................... 094220218

(51) Int. Cl.
*H02P 1/00* (2006.01)
*H02P 3/08* (2006.01)

(52) U.S. Cl. ............... 318/254; 318/139; 318/439; 318/727; 388/803

(58) Field of Classification Search ........... 318/139, 318/245, 254, 437, 432, 439, 268, 492, 727; 388/803
See application file for complete search history.

(56) References Cited

U.S. PATENT DOCUMENTS

| | | | | |
|---|---|---|---|---|
| 4,491,772 A * | 1/1985 | Bitting | .............. | 318/254 |
| 4,494,055 A * | 1/1985 | Bitting et al. | .............. | 318/254 |
| 4,499,408 A * | 2/1985 | Bitting et al. | .............. | 318/254 |
| 4,500,821 A * | 2/1985 | Bitting et al. | .............. | 318/254 |
| 4,687,977 A * | 8/1987 | Brahmavar et al. | .......... | 318/492 |
| 5,099,408 A * | 3/1992 | Chen et al. | .............. | 363/41 |
| 5,557,182 A * | 9/1996 | Hollenbeck et al. | ........ | 318/432 |
| 5,882,185 A * | 3/1999 | Kim | .............. | 431/20 |
| 5,952,798 A * | 9/1999 | Jones et al. | .............. | 318/268 |
| 6,008,603 A * | 12/1999 | Jones et al. | .............. | 318/254 |
| 6,163,117 A * | 12/2000 | Rappenecker | .............. | 318/254 |
| 6,545,442 B2 * | 4/2003 | Sunaga et al. | .............. | 318/727 |
| 6,603,277 B2 * | 8/2003 | Yoshimura | .............. | 318/139 |
| 7,030,584 B1 * | 4/2006 | Alberkrack | .............. | 318/439 |
| 2003/0155886 A1 * | 8/2003 | Ohiwa et al. | .............. | 318/727 |
| 2004/0007998 A1 * | 1/2004 | Yasohara et al. | ........... | 318/437 |
| 2004/0061470 A1 * | 4/2004 | Ito et al. | .............. | 318/565 |
| 2005/0194918 A1 * | 9/2005 | Takeuchi | .............. | 318/135 |

FOREIGN PATENT DOCUMENTS

JP        62032297 A * 2/1987

* cited by examiner

*Primary Examiner*—Paul Ip
(74) *Attorney, Agent, or Firm*—Rosenberg, Klein & Lee

(57) ABSTRACT

A universal low-power ceiling fan controller includes a brushless DC motor in a ceiling fan casing, a microprocessor connected to a power supply that operates with a remote-control device and has a transmitter and a receiver for transmitting data signals to the microprocessor by wireless transmissions, a driving device installed between the microcontroller and the motor for turning on or off a fan, and a feedback device having at least three Hall components for continuously sending feeding back a position change to the microcontroller for determining the motor speed, such that the microcontroller receives the signals of the remote-control device and the driving device drives the motor to rotate, and sample signals of the feedback device is fed back to the microcontroller to determine and conduct an automatic compensation, so as to maintain a constant speed of the vanes of the ceiling fan and lower the electric power consumption.

7 Claims, 8 Drawing Sheets

UNIVERSAL LOW-POWER CEILING FAN CONTROLLER

FIELD OF THE INVENTION

The present invention relates to a controller, and more particularly to a low-power ceiling fan controller that uses a microcontroller to control and drive a brushless motor and operates it with a feedback device to continuously and automatically determine a position feedback for an automatic compensation of the microcontroller, so as to achieve a constant rotary speed and a remote-control linear stepless speed adjustment of the ceiling fan.

BACKGROUND OF THE INVENTION

According to evaluations made by the Electric Power Research Institute (EPRI), the consumption of electric power is approximately 40% of the total energy capacity. Since the motor driving components used in electric equipments often require electric power as their energy source, therefore it is a key point for the design to reduce the power consumption of a motor. The motor structure adopts a continuous driving method and is divided into two types: a brush structure and a brushless structure, and the brush motor is a DC motor, and the brushless motor is a brushless DC sensing motor; wherein the brush structure includes an electric brush and a rectifier. Therefore, the using life of the motor will be very limited, the electromagnetic interference will be high, and the noise will occur, if the motor is under the friction and contact for a long time, and thus causing a poor contact easily and occupying larger volume, and its brush requires maintenance. The brushless motor such as a DC brushless motor adopts an electronic commutation structure having a speed up to 10,000 rpm and a wider speed range. In addition, the brushless DC motor features a low rotor inertia, a low electromagnetic interference, a free carbon brush maintenance, a free carbon brush dust, and a small volume. Therefore, its application is superior to the brush DC motor, and the present invention uses a brushless DC motor as the main drive.

As to the ceiling fan structure, a motor is used for driving the vanes to rotate and produce winds, so as to achieve the air cooling effect. However, the technology of the ceiling fans tends to have additional functions including a sleep mode, an air conditioning, an expedited air-conditioned circulation, a decoration, an illumination, a low power consumption, and a remote control function, in addition to providing wind and dissipating heat.

Since the use of the ceiling fans is very popular in everyday life and users have high demands on stability, safety, comfortability, convenience for its functions, therefore finding a way for lowering the power consumption, adjusting the speed stepless, achieving the remote control, and the low-speed noiseless functions becomes a key point for the design of a good ceiling fan system in the industry.

SUMMARY OF THE INVENTION

Referring to FIGS. 6 and 7, a prior art ceiling fan structure 80 includes a DC brushless motor 81 disposed inside a ceiling fan casing for driving the vanes 82 to produce airflows, wherein the brushless DC motor 81 comprises a stator 83 and a rotor 84, and the rotor 84 includes a plurality of mutually repelled permanent magnets disposed in a circular yoke, characterized in that the stator 83 includes a multi-polar magnetism of more than two poles, and each magnet includes a coil wound around the magnet and Hall components 85, 86 on the sensing surface of a specific magnet. The Hall components 85, 86 are coupled to an electronic switch module 87, and each switch module of the electronic switch module 87 is coupled to the power supply and each electromagnetic coil, and the Hall components 85, 86 are used for detecting the polarity change of the permanent magnet, such that the corresponding electromagnetic activation drives the rotor to rotate, and the coil is electrically connected, and the best angle for the electromagnetic polarity is changed when the coil is electrically connected, so as to improve the motor performance.

Referring to FIG. 8 for another ceiling fan driving control device, a remote control coder 90 is used for a ceiling fan that comprises a microprocessor 91, a high-frequency receiver 92, and an external memory (EEPROM) 93, wherein the microprocessor 91 is connected to a power supply 94 for supplying power, and I/O contact points of the microprocessor 91 are coupled to a lamp 95 and a fan motor 96 respectively. Further, other I/O contact points of the microprocessor 91 are connected to a high-frequency receiver 92 and an external memory 93, wherein the external memory 93 has the function of reading and writing memory in a power failure and can be used for automatically detecting and setting up the decoded address of the corresponding transmitter by a RF coding function after the ceiling fan is powered on, so as to facilitate users to change the decoded address of the ceiling fan remote control coder 90 and improve the inconvenient prior art that requires removing the whole ceiling fan before operating the switch address code of a remote control device. Such ceiling fan driving control device provides a remote control coder that can avoid interferences and change the corresponding decoding address of remote control coder. However, such structure only provides a function of transmitting signals to drive the lamps 95 and ceiling fan motor 96, so as to achieve the function of the stepless speed adjusting function.

Wind flow is one of the conditions of selecting a ceiling fan, and the quantity of wind flow determines the rotary speed of the motor. To maintain a constant wind flow, the rotary speed of the motor must be stable. However, if the vanes of the foregoing prior art structure are changed and the load is varied, or the voltage and frequency of the city electric power are unstable and the rotary speed is changed, the voltage will vary accordingly. In view of the shortcoming of the prior art structure that consumes much electric power for driving the motor, the inventor of the present invention invented a low-power ceiling fan controller.

To overcome the foregoing shortcomings, the present invention discloses a universal low-power ceiling fan controller installed inside a ceiling fan casing, which comprises a brushless DC motor installed in the ceiling fan casing, a microcontroller coupled to a power source and operating with a remote control device including a transmitter and a receiver for sending data signals to the microcontroller by a wireless transmission method, a driving device installed between the microcontroller and the brushless DC motor for turning on or off the ceiling fan, and a feedback device having at least three Hall components for continuously sensing a position variation and feeding back the position variation to the microcontroller to determine the speed of the brushless DC motor. With the foregoing components, the microcontroller receives a signal from the remote control device, and the driving device drives the brushless DC motor to rotate by means of a sample signal feedback of the feedback device for the microcontroller to determine and conduct an automatic compensation, so as to maintain a constant rotary speed of the vanes of the ceiling fan while reducing the power consumption.

The primary objective of the present invention is to provide a universal low-power ceiling fan controller for maintaining a constant rotary speed of the fan regardless of the quantity, weight, or different specification of the vanes of the ceiling fan.

The secondary objective of the present invention is to provide a universal low-power ceiling fan controller that has a universal voltage, and maintains a constant rotary speed, regardless of the voltage and frequency issues of city electricity in different countries and the instability of their variations.

A further objective of the present invention is to provide a universal low-power ceiling fan controller having a remote-control stepless rotary speed adjusting function.

Another further objective of the present invention is to provide a universal low-power ceiling fan controller applicable for ceiling fans with a brushless DC motor, so as to greatly reduce the power consumption and maximize the power saving effect.

BRIEF DESCRIPTION OF THE DRAWINGS

To make it easier for our examiner to understand the objective, shape, assembly, structure, characteristics and performance of the present invention, the following embodiments accompanied with the related drawings are described in details.

DETAILED DESCRIPTION OF THE PREFERRED EMBODIMENTS

Figure 1:
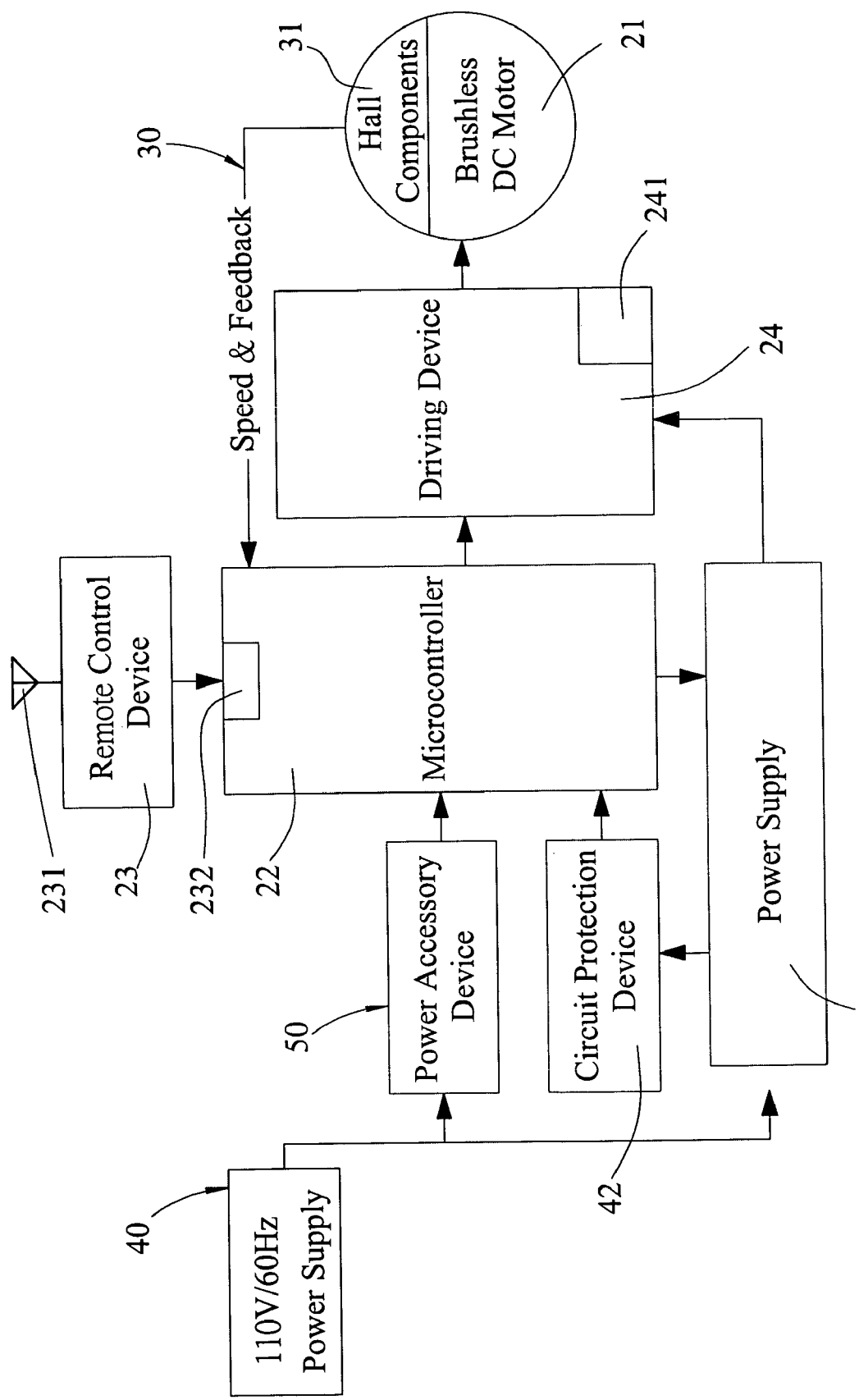
FIG. 1 is a flow chart of a preferred embodiment of the present invention.
Figure 2:
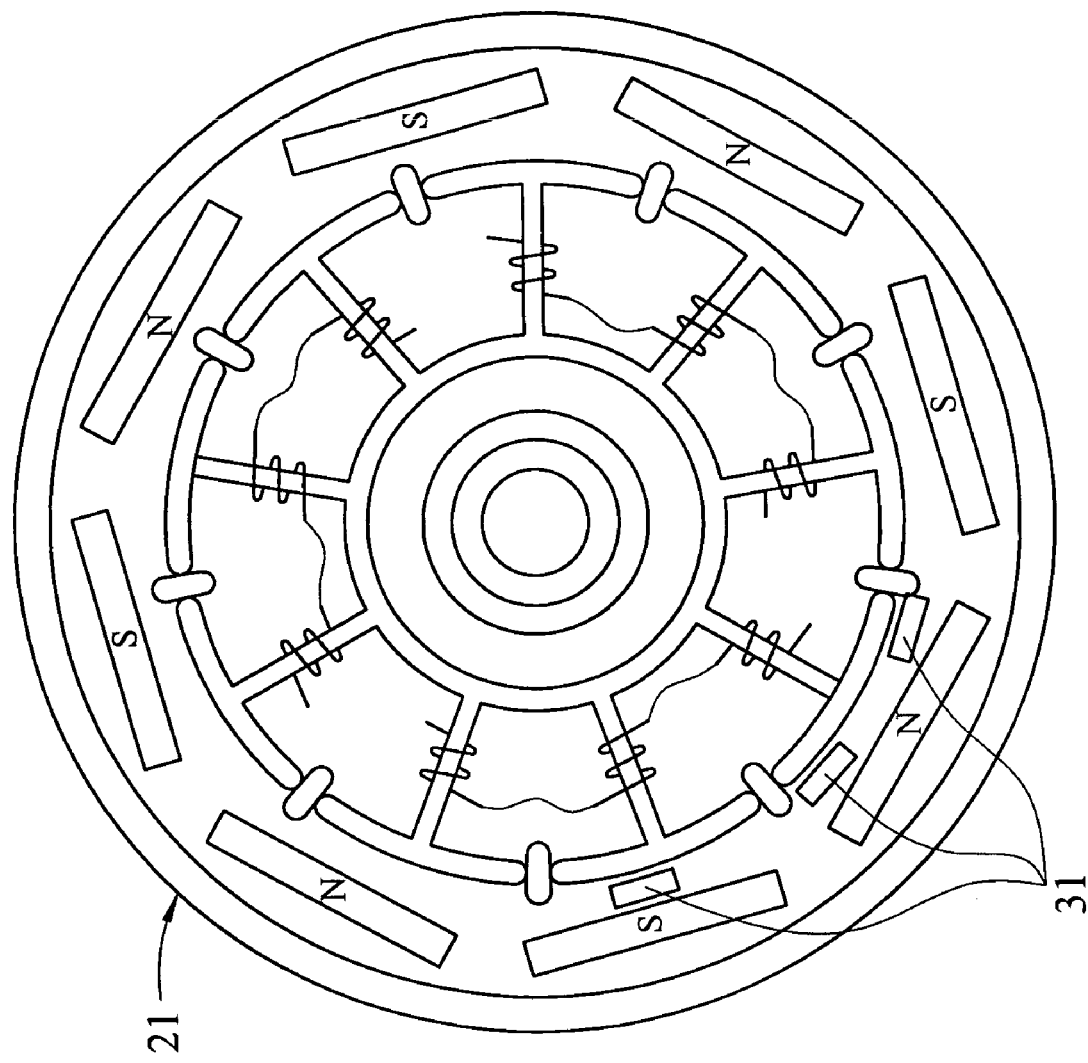
FIG. 2 is a schematic view of a preferred embodiment of the present invention.

Referring to FIGS. 1 to 2, the present invention provides a universal low-power ceiling fan controller installed inside a ceiling fan casing, which comprises a brushless DC motor 21, a microcontroller 22, a remote control device 23, a driving device 24, and a feedback device 30.

The brushless DC motor 21 is installed in the ceiling fan driving structure 80 for driving the vanes of the ceiling fan.

The microcontroller 22 is connected to a power supply 40 for providing the signal processing, analysis, control, detection, and transmission functions.

The remote control device 23 uses radio frequency (RF) and infrared (IR) wireless transmission methods to operate with a receiving antenna 231 and a receiver 232 to send the data signal to the microcontroller 22, wherein the receiver 232 is connected to the microcontroller 22, such that the signal is sent to the microcontroller 22 after the signal is received and converted.

The driving device 24 is a driving circuit with a three-arm switch structure comprising six power switches and including a metal oxide semiconductor field effect transistor 241 or a bipolar junction transistor (BJT) installed between the microcontroller 22 and the Brushless DC motor 21 for receiving an instruction given by the microcontroller 22 to control the operation of turning on or off the brushless DC motor 21.

The feedback device 30 includes three Hall components 31 arranged at predetermined positions adjacent to each other and at 60 degrees or 120 degrees in the brushless DC motor 21 and having a magnetic sensing device for continuously detecting a position change and feeding back the detected signal to the microcontroller 22 for determining the speed of the brushless DC motor 21.

Further, a power supply 41 is installed at the driving circuit between the power supply 40 and driving device 24 for controlling a constant speed of the brushless DC motor 21 to provide an easy-to-control and stable voltage amplitude (approximately 6V~40V), and a circuit protection device 42 is installed between the power supply 41 and the driving device 24, such that the driving circuit can reduce circuit damages caused by improper loading operations.

A power accessory device 50 is installed between the power supply 40 and the microcontroller 22 for outputting a lower-power and stable accessory power supply (approximately 5V) to the microcontroller 22 and having an electric potential detecting function for monitoring the system voltage change anytime to avoid system cracks caused by an unstable voltage of the microcontroller.

To make it easy for our examiner to understand the structure features, technical measures and expected performance, the present invention is described by a preferred embodiment accompanied with related drawings as follows:

The invention adopts a design of using the microcontroller 22 to control a constant rotary speed of the brushless DC motor 21, so that when the brushless DC motor 21 rotates, the Hall components 31 disposed adjacent to the brushless DC motor 21 detects the position status between the two and feeds back the signal to the microcontroller 22, and the microcontroller 22 uses such signal to compute the time difference between the two and convert the two into the rotary speed of the brushless DC motor 21. After the data signal is analyzed and processed, a command signal is transmitted to the driving device 24 for compensating the speed of the brushless DC motor 21. If the rotary speed is too slow, then an AC/DC high-frequency switching converter is used for increasing the AC voltage, and if the speed is too fast, then the AC voltage is lowered, so as to achieve the constant speed effect. In the meantime, the updated position information is obtained, and the sampling and feedback are conducted continuously between each microcontroller 22 and Hall component 31, and thus the present invention can still maintain a predetermined speed and produce a fixed quantity of wind flow when it is necessary to change the vanes of a ceiling fan with a different material specification and weight loading or the problems caused by insufficient and unstable voltage of the city electricity.

Further, sampling and feedback are conducted continuously between each microcontroller 22 and each Hall component 31 to transmit signals to the microcontroller 22. After the microcontroller 22 computes, processes, and analyzes the signals, the rotary speed of the brushless DC motor 21 required for controlling each driving device 24 is compensated and adjusted, and such continuous and accurate automatic detecting compensation and adjustment of the rotary speed can achieve the stepless speed adjusting effect.

Further, the driving device 24 of the invention is a small-capacity bipolar junction transistor (BJT) module or a large-capacity metal oxide semiconductor field effect transistor (MOSFET) module 241 depending on the specification and size of the brushless DC motor 21.

In the meantime, the remote control device 23 adopts the wireless transmission method, and the remote control device could use radio frequency (RF) or infrared (IR) wireless transmissions, which remotely controls the operations of the brushless DC motor 21 of the ceiling fan within a range, and also adjusts and sets the rotary speed.

It is worth pointing out that there are three technical measures taken for reducing the power consumption: using a brushless DC motor to replace traditional sensing motors; using a high-efficient high-frequency switching power supply to replace DC power source, and using a passive valley-fill power factor corrector to increase the power factor of the system and minimize the waste of power.

Figure 3:
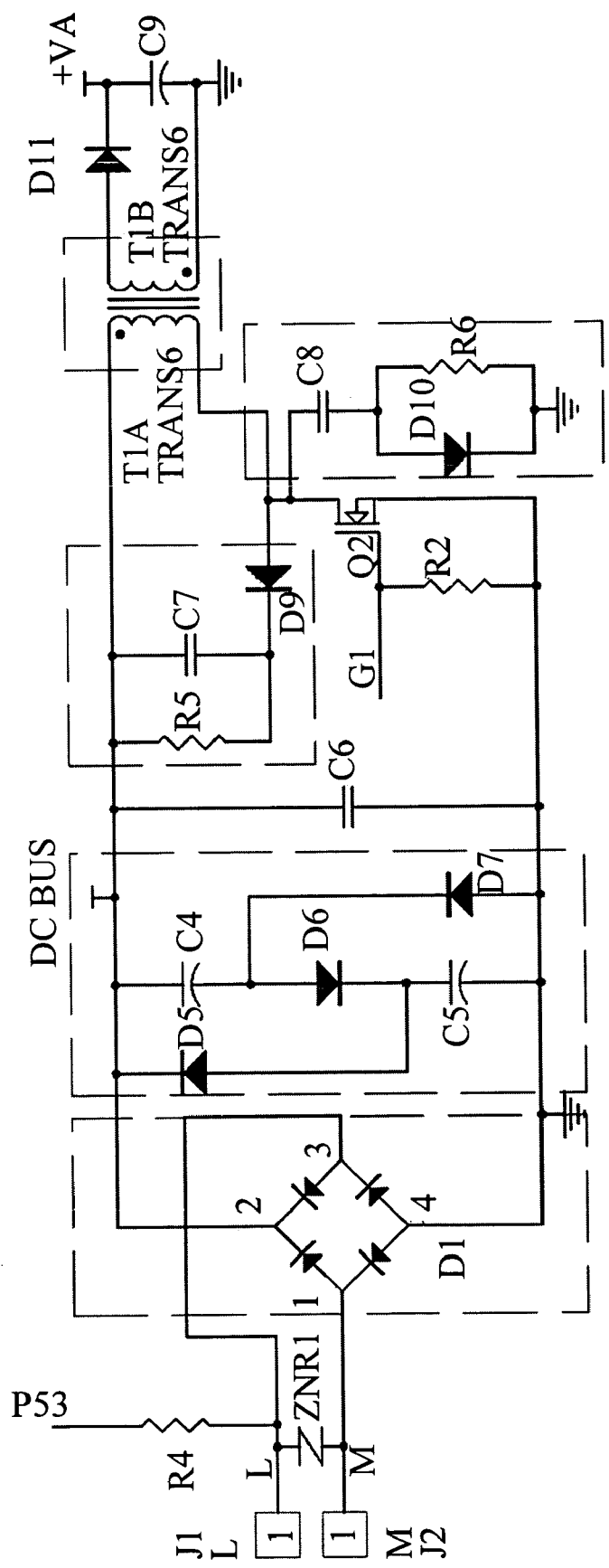
FIG. 3 is a schematic circuit diagram of a preferred embodiment of the present invention.
Figure 4:
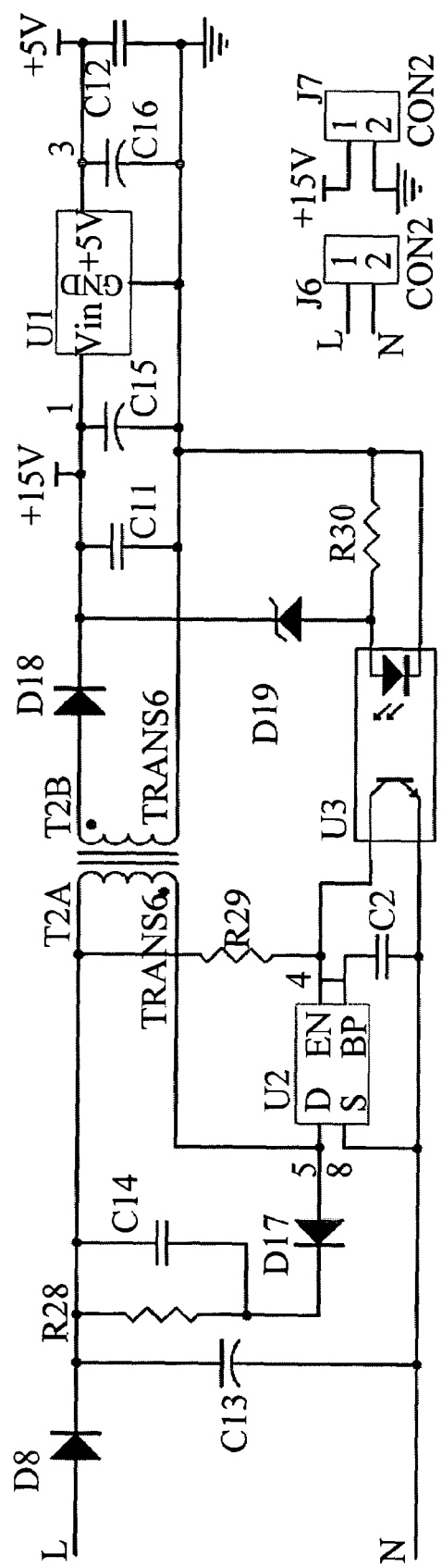
FIG. 4 is another schematic circuit diagram of a preferred embodiment of the present invention.

Referring to FIGS. 3 and 4, the high-frequency switching power supply comprises a power switch Q2, a transformer T1, a diode D11, and an output capacitor C9, and the transformer T1 has the function of a capacitor, and the basic operating principle is to store the energy into the capacitor of a primary T1A of the transformer when the power switch Q2 is connected electrically, and the energy is sent from the transformer to a secondary T1B when the power switch is disconnected. After the rectification is conducted by the diode D11 and the filter is conducted by the capacitor C9, the power is outputted to the negative load, and thus such arrangement can achieve a conversion efficiency of over 80%, and the output end has an isolating effect, and the output ripples and noises are below 1%. Further, the idle power supply of a high-frequency switching power supply comprises a power integrated circuit U2, a transformer T2, a diode D1, a capacitor 11, a Zener diode D19, and a photocoupler integrated circuit U3, and the operating principle is to store the energy into the capacitor of a primary T2A of the transformer when the power integrated circuit U2 is connected electrically, and the energy is sent from the transformer to a secondary T2B when the power switch is disconnected. After the energy is sent from the transformer to the secondary T2B for the output, and the rectification is conducted by the diode D1 and the filter is conduced by the capacitor C11, the voltage is outputted stably to the negative load, and the Zener diode D19 and photocoupler integrated circuit U3 feed back the voltage at the negative load end to the power integrated circuit U2 to adjust the electric connecting time of the switch and achieve a stable voltage, so as to reduce the idle power supply to 0.47 W while having the over-voltage and over-current protection and antistatic charges functions.

Referring to FIG. 3, the passive valley-fill power factor corrector comprises a diode D5, D6, D7 and a capacitor C4, C5, and the operating principle is to electrically connect the diode D6, disconnect the diodes D5, D7 when the power rectification circuit D1 is electrically connected, and the power supply stores energy to the capacitors C4, C5 and outputs the power to a negative load. After the capacitors C4, C5 are fully charged, the diodes D5, D6, D7 are disconnected, and the power is outputted to the negative load only. When the power rectification circuit D1 is disconnected, the diodes D5, D7 are electrically connected, the capacitors C4, C5 supplies power to the negative load circuit, such that when the power rectification circuit D1 is disconnected, the input of electric current remains, so as to lower the distortion of input current and improve the power factor.

Figure 5:
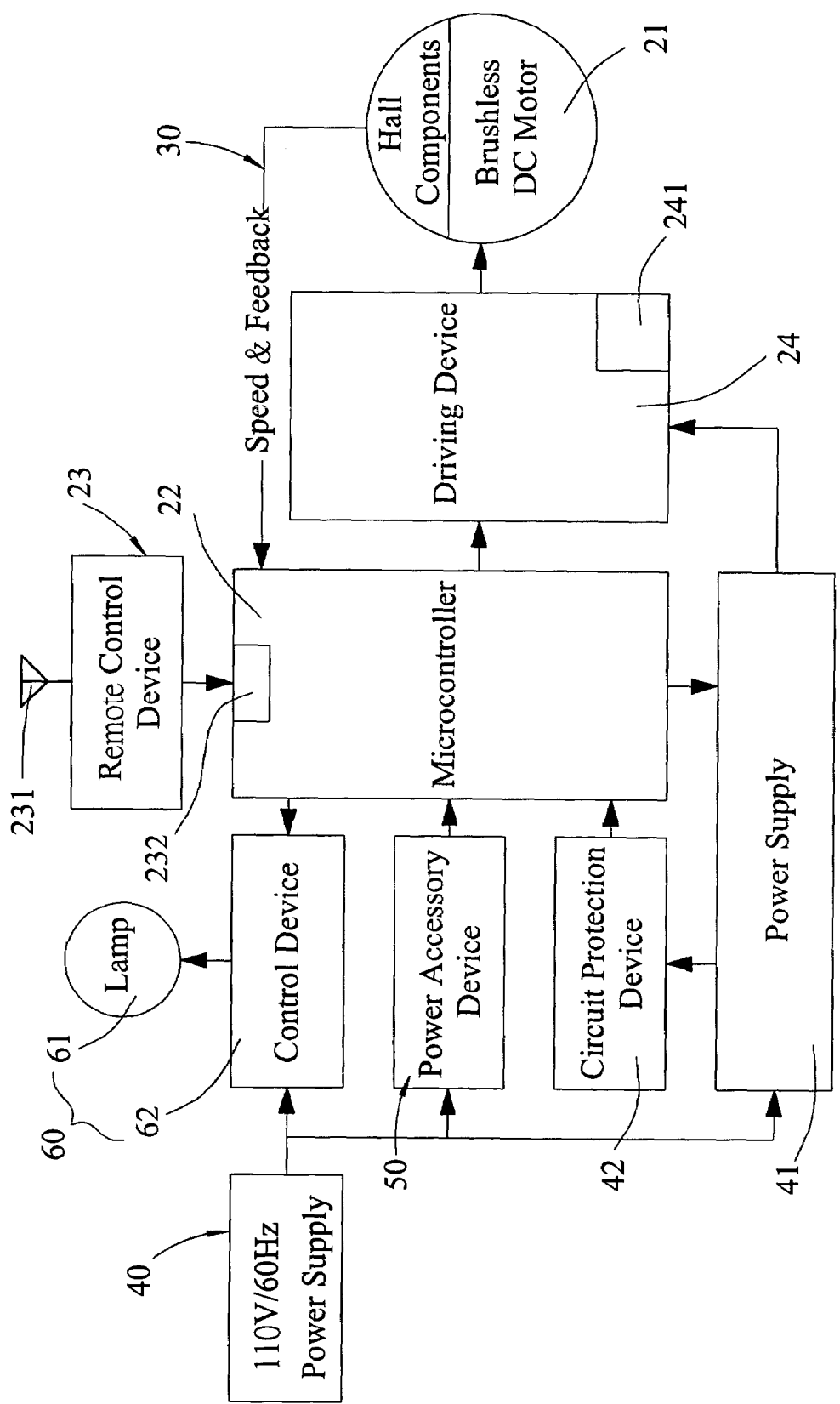
FIG. 5 is a flow chart of another preferred embodiment of the present invention.
Figure 6:
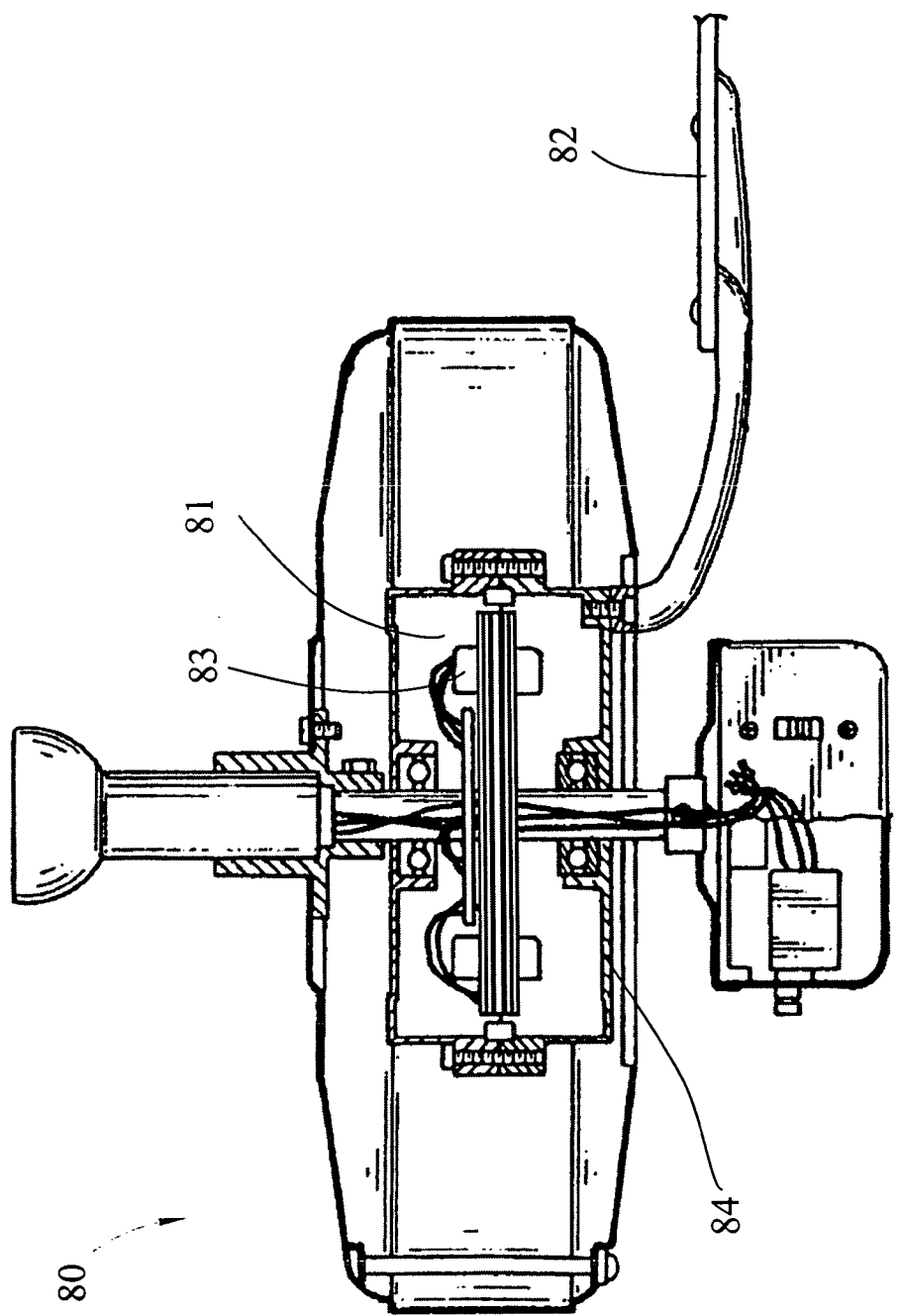
FIG. 6 is a cross-sectional view of a prior art structure.
Figure 7:
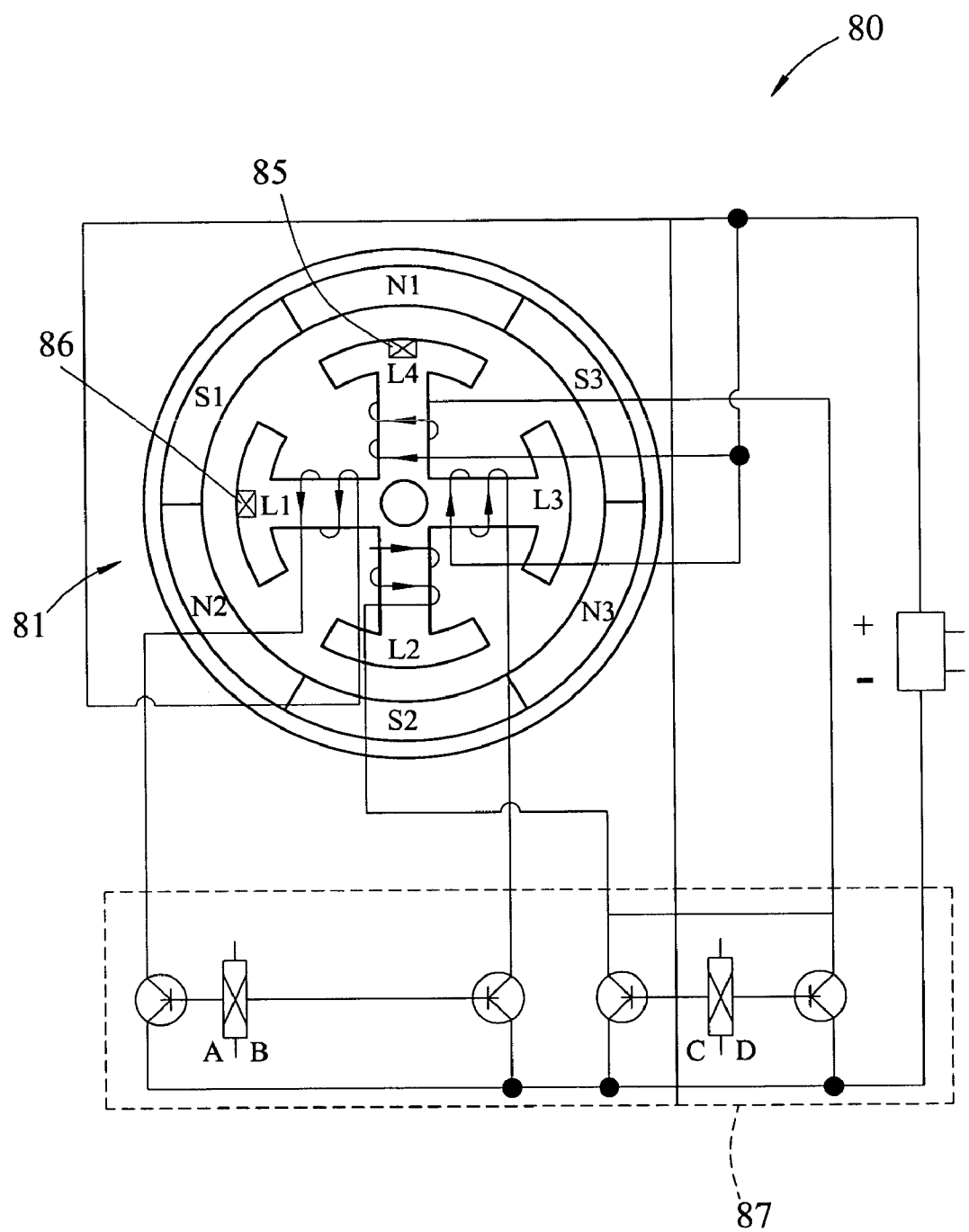
FIG. 7 is a schematic view of a control system of a prior art structure.
Figure 8:
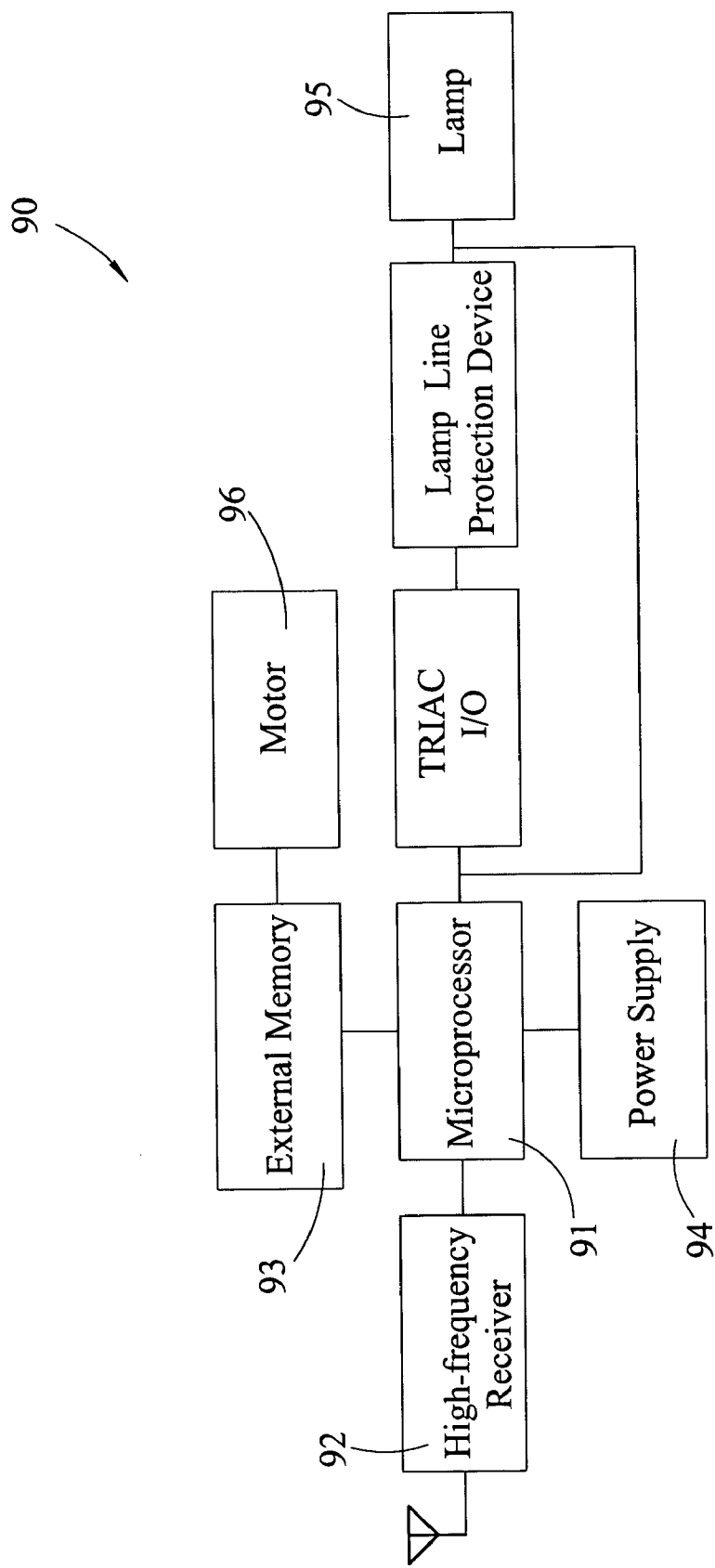
FIG. 8 is a flow chart of another prior art structure.

Referring to FIG. 5, another preferred embodiment of the present invention comprises a light adjusting device 60, a lamp 61 being a light emitting device installed between each power supply 40 and the microcontroller 22, a control device 62 being a triode for alternating current (TRIAC) for receiving an instruction given by the microcontroller 22 to turn on or off the lamp 61 and produce a trigger voltage to electrically connect the control device 62 and use the trigger angle to obtain a different output power, so as to achieve a linear light adjusting effect and preventing the blinking of light.

In summation of the description above, the universal low-power ceiling fan controller in accordance with the present invention uses the microcontroller to control each driving device and brushless DC motor and operate together with the feedback device to achieve stepless linear adjusting constant speed rotations. With the remote control device 23, the structure of the invention adopts a microcontroller 22 driven by a wireless transmission and a remote control to obtain a stepless adjustment of a constant rotary speed and control a low power consumption of the fan. The structure of the invention herein enhances the performance and overcomes the shortcoming of the prior art, and further complies with the patent application requirements.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A universal low-power ceiling fan controller, installed in a ceiling fan casing, comprising:

a brushless DC motor, installed in said ceiling fan casing for driving vanes of said ceiling fan;

a driving device coupled to said brushless DC motor for controlling power supplied thereto;

a power supply having an input coupled to an electric power source and an output coupled to said driving device for supplying a stable voltage thereto, said power supply including a power factor correction circuit for compensating for an inductance of said brushless DC motor;

a microcontroller, coupled to said power supply and said driving device for providing the functions of processing, analyzing, controlling, detecting and transmitting of signals, said microcontroller providing instruction signals to said driving device for controlling operation of said brushless DC motor;

a remote control device including a transmitter and a receiver coupled to said microcontroller for transmission of a data signal to said microcontroller by a wireless transmission method, said receiver converting said data signal for input to said microcontroller;

a feedback device coupled to said microcontroller and having at least three Hall components separately installed at predetermined positions of said brushless DC motor for continuous magnetic sensing of a position change and feeding back a sensed signal to said microcontroller to determine a speed of said brushless DC motor;

such that after said microcontroller receives and analyzes a signal from said remote control device, said driving device drives said brushless DC motor to rotate and operate with said position signal of said feedback device and continues sampling and feeding back said signal to said microcontroller to determine and conduct an automatic speed compensation, so as to maintain a constant speed of the rotation of said vanes of said ceiling fan while reducing electric power consumption.

2. The universal low-power ceiling fan controller of claim 1, wherein said power supply is a high-frequency switching power supply includes a power switch coupled to an input of a transformer, a rectification diode coupled to an output of said transformer, and an output capacitor coupled to said diode for filtering a DC output of said diode.

3. The universal low-power ceiling fan controller of claim 1, wherein said power factor correction circuit of said power supply is a valley-fill power factor corrector.

4. The universal low-power ceiling fan controller of claim 1, further comprising a circuit protection device installed between said power supply and said driving device for providing over-voltage, over-current, over-temperature protecting functions.

5. The universal low-power ceiling fan controller of claim 1, further comprising a power accessory device installed between said power source and said microcontroller to serve as an accessory power supply with a lower output power for supplying power to said microcontroller.

6. The universal low-power ceiling fan controller of claim 1, wherein said driving device comprises the functions of providing a circuit compensation, an open circuit, and an overload circuit protection, and further comprises a light adjusting device installed between said power source and said microcontroller and having a lamp which is a light emitting device; a control element for receiving an instruction given by said microcontroller to turn on or off said lamp and producing said control device to trigger a voltage connection and obtaining a different output power according to a triggered angle, so as to achieve a light adjusting effect.

7. The universal low-power ceiling fan controller of claim 1, wherein said Hall components are disposed in at a position having a magnetic sensing and with an interval of 60° or 120°.

* * * * *